(12) United States Patent
Knecht et al.

(10) Patent No.: US 6,350,062 B2
(45) Date of Patent: *Feb. 26, 2002

(54) MULTIFIBER FERRULE DEFINING ALIGNMENT HOLES HAVING A TAPERED LEAD-IN PORTION

(75) Inventors: Dennis M. Knecht; Joel C. Rosson; Markus A. Giebel; James P. Luther; Karl M. Wagner; David L. Dean, Jr., all of Hickory, NC (US)

(73) Assignee: Corning Cable Systems LLC, Hickory, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,530

(22) Filed: May 7, 1999

(51) Int. Cl.[7] ................................................. G02B 6/36
(52) U.S. Cl. .............................. 385/84; 385/59; 385/60; 385/65
(58) Field of Search .............................. 385/60, 65, 59, 385/71, 72, 78, 83, 84

(56) References Cited

U.S. PATENT DOCUMENTS

| | | | | |
|---|---|---|---|---|
| 4,994,134 A | * | 2/1991 | Knecht et al. | 156/294 |
| 5,315,678 A | * | 5/1994 | Maekawa et al. | 385/59 |
| 5,555,332 A | * | 9/1996 | Dean et al. | 385/59 |
| 5,600,747 A | * | 2/1997 | Yamakawa et al. | 385/71 |

* cited by examiner

Primary Examiner—Frank G. Font
Assistant Examiner—Sang H. Nguyen
(74) Attorney, Agent, or Firm—Michael L. Leetzow

(57) ABSTRACT

A multifiber ferrule is provided that includes a ferrule body that defines at least one elongate hole opening through the front face of the ferrule body that, in turn, includes a lead-in portion proximate the front face for guiding the respective alignment member into the elongate hole. The ferrule body at least partially defines one or more elongate holes, such as a guide pin hole or an alignment groove, each having a longitudinal axis extending therethrough. Each elongate hole includes the lead-in portion proximate the front face and an adjacent alignment portion. The lead-in portion expands radially outward from the longitudinal axis in a direction extending from the adjacent alignment portion to the front face of the ferrule body. As such, the opening of the lead-in portion through the front face of the ferrule body is larger in lateral cross-section than the opening of the lead-in portion into the adjacent alignment portion. The lead-in portion is therefore capable of guiding the respective alignment member into the adjacent alignment portion that, in turn, is sized to snugly receive the alignment member, thereby serving to properly align the ferrule with the alignment members. In addition, the lead-in portion of each elongate hole defined by the multifiber ferrule serves as a receptacle for dirt or other particulates that are transferred from the alignment member as the alignment member is inserted into the respective elongate hole.

20 Claims, 4 Drawing Sheets

MULTIFIBER FERRULE DEFINING ALIGNMENT HOLES HAVING A TAPERED LEAD-IN PORTION

FIELD OF THE INVENTION

The present invention relates generally to multifiber ferrules and, more particularly, to the alignment holes, such as the guide pin holes and the alignment grooves, defined by multifiber ferrules that cooperate with alignment members to appropriately align the multifiber ferrules.

BACKGROUND OF THE INVENTION

As a result of the ever increasing utilization of optical communications for both voice and data applications, multifiber connectors are being more frequently utilized in order to simultaneously interconnect a plurality of optical fibers. Not only are multifiber connectors being utilized in larger numbers, but increased performance demands are being placed upon multifiber connectors, as well as all other portions of the optical network. For example, in order to maximize signal transmission between pairs of optical fibers, multifiber connectors are required to align each of the optical fibers very precisely, especially for single mode applications. In this regard, multifiber connectors are typically required to align each optical fiber to within 7 to 14 microns for multimode applications and to within 0 to 3 microns for single mode applications.

In order to provide the desired alignment, conventional multifiber connectors include multifiber ferrules that at least partially define a pair of elongate alignment holes that receive and cooperate with respective alignment members, such as guide pins or alignment ribs, in order to appropriately align the multifiber ferrule and, in turn, the optical fibers upon which the multifiber ferrule is mounted. For example, one conventional type of multifiber ferrule is the MT ferrule, such as described by U.S. Pat. No. 5,214,730 to Sinji Nagasawa, et al., and assigned to Nippon Telephone and Telegraph Corporation of Tokyo, Japan. The MT ferrule has a generally rectangular shape in lateral cross-section and defines a pair of guide pin holes opening through the front face for receiving respective guide pins. As such, a pair of multifiber connectors having respective MT ferrules that are to be interconnected are typically configured such that one of the multifiber connectors has a male configuration and the other multifiber connector has a female configuration. The male configuration of the multifiber connector includes a pair of guide pins that have been inserted within the guide pin holes defined by the respective MT ferrule and that extend beyond the front face of the multifiber ferrule. In contrast, the female configuration of the multifiber connector includes a female MT ferrule that defines a pair of guide pin holes for receiving those portions of the guide pins that extend beyond the front face of the MT ferrule of the male connector. During mating, the insertion of the guide pins into the guide pin holes defined by the MT ferrule of the female connector aligns the connectors and, in turn, aligns the optical fibers upon which the MT ferrules are mounted. In order to snugly receive the guide pins, the guide pin holes defined by a conventional MT ferrule are cylindrical in lateral cross-section so as to have the same size and shape along their entire length. By utilizing cylindrical guide pin holes, the sidewalls that form the cylindrical guide pin holes contact the guide pins along their entire length, thereby correspondingly maximizing the alignment provided by the guide pins.

Another advantageous type of multifiber ferrule is the SC-DC multifiber ferrule provided by Siecor Corporation of Hickory, N.C., the assignee of the present invention. The SC-DC ferrule has a generally circular shape in lateral cross-section and defines a pair of alignment grooves extending along opposed side surfaces. During the mating of an SC-DC ferrule with another SC-DC ferrule, the elongate grooves defined by the opposed side surfaces of the ferrule engage respective alignment ribs or pins to align the ferrules and, in turn, the optical fibers upon which the ferrules are mounted. For example, alignment ribs are generally defined by and extend inwardly from the inner sidewalls of an alignment sleeve. Upon inserting the SC-DC ferrules into the opposed ends of the aligmnent sleeve, the alignment ribs or pins engage and are slidably advanced through the grooves defined by the respective ferrules, thereby aligning the ferrules within the alignment sleeve. As described above in conjunction with the guide pin holes defined by an MT ferrule, the alignment grooves defined by the opposed side surfaces of an SC-DC ferrule typically have the same semi-circular size and shape in lateral cross-section along their entire length. As such, the sidewalls that form the alignment grooves contact the alignment ribs or pins along their entire length, thereby correspondingly maximizing the alignment afforded by the alignment grooves and the alignment ribs or pins.

While conventional multifiber ferrules, such as the MT and SC-DC ferrules described above, effectively cooperate with alignment members, such as guide pins and alignment ribs, in order to align the optical fibers upon which the ferrules are mounted, conventional alignment techniques still suffer from several limitations. For example, attempts to insert those portions of the guide pins that protrude beyond the front face of the male configuration of an MT ferrule into the guide pin holes defined by the female configuration of an MT ferrule can sometimes initially stub the ends of the guide pins against the front face of the female MT ferrule. As such, the guide pins and/or the front face of the female MT ferrule may be damaged. At the least, this pin stubbing will increase the care and, therefore, the time that must be taken by a technician during the interconnection of a pair of multifiber ferrules. In an attempt to reduce the stubbing, the leading portion of most guide pins are tapered to facilitate insertion of the guide pins into the respective guide pin holes. As a result of the relatively small size of most guide pins that typically have a diameter of 700 microns, MT ferrules may still be misaligned by more than the diameter of the guide pin as the MT ferrules are brought into contact. In these instances, the tapered leading end of the guide pin will not serve to guide the guide pin into the respective guide pin hole, but will instead stub against the front face of the female MT ferrule.

With respect to the interaction of the alignment ribs or pins of an alignment sleeve and the elongate grooves defined by the opposed side surfaces of an SC-DC ferrule, it has been found that the alignment ribs or pins are sometimes damaged as the SC-DC ferrule is inserted into the respective alignment sleeve, thereby diminishing the precision with which the alignment ribs or pins align the optical fibers upon which the SC-DC ferrule is mounted. In this regard, it is believed that the sharp edge that defines the opening of the elongate grooves through the front face of an SC-DC ferrule oftentimes gouges the alignment ribs or pins as the SC-DC ferrule is being inserted into the respective alignment sleeve since the SC-DC ferrule is oftentimes oriented in a direction that is slightly offset from the longitudinal axis of the sleeve during its insertion into the sleeve. After being gouged by the sharp edges defined by the opening of the elongate grooves through the front face of an SC-DC ferrule, the alignment ribs or pins may no longer have the desired size and shape to cooperate with the elongate grooves for precisely aligning the respective ferrules.

Additionally, the precision with which all types of multifiber ferrules can be alignment is diminished as dirt and other particulates collect in or about the alignment holes defined by the multifiber ferrule, such as the guide pin holes defined by an MT ferrule or the elongate grooves defined by an SC-DC ferrule. In this regard, dirt and other particulates are oftentimes carried by an alignment member, such as a guide pin or an alignment rib. Upon insertion of a guide pin into a guide pin hole defined by an MT ferrule, any dirt or other particulates carried by the guide pin are typically wiped from the guide pin and collect about the circumference of the guide pin hole on the front face of the MT ferrule. Likewise, the insertion of an SC-DC ferrule into an alignment sleeve and the corresponding insertion of the alignment rib into the elongate groove defined by the SC-DC ferrule will oftentimes cause the dirt or other particulates carried by the alignment rib to be wiped from the alignment rib and collect on the front face of the SC-DC ferrule proximate the groove. While the accumulation of any amount of dirt or other particulates upon the front face of the ferrule is disadvantageous, it is possible that sufficient dirt and other particulates may accumulate upon the front face of the multifiber ferrule to prevent physical contact between the front faces of a pair of multifiber ferrules following mating of the multifiber ferrules. Without achieving physical contact between the front faces of a pair of mated multifiber ferrules, the quality of the resulting optical interconnection will likely be somewhat impaired.

SUMMARY OF THE INVENTION

These and other shortcomings of conventional multifiber ferrules are addressed by the multifiber ferrule of the present invention that includes a ferrule body that defines at least one elongate hole opening through the front face of the ferrule body that, in turn, includes a lead-in portion proximate the front face for guiding the respective alignment member into the elongate hole. As such, the multifiber ferrule of the present invention significantly reduces the occurrences of pin stubbing during the alignment of MT-type ferrules. In addition, the multifiber ferrule of the present invention significantly reduces gouging or other damage incurred by an alignment rib during the insertion of an SC or DC-type ferrule into a corresponding alignment sleeve. Finally, the lead-in portion of each elongate hole defined by the multifiber ferrule of the present invention serves as a receptacle for dirt or other particulates that are transferred from the alignment member as the alignment member is inserted into the respective elongate hole. As a result, the dirt or other particulates do not collect on the front face of the multifiber ferrule such that physical contact can continue to be established between the front faces of a pair of multifiber ferrules.

Regardless of the type of multifiber ferrule, the ferrule body at least partially defines one or more elongate holes, each having a longitudinal axis extending therethrough. Each elongate hole includes the lead-in portion proximate the front face and an adjacent alignment portion. The lead-in portion expands radially outward from the longitudinal axis in a direction extending from the adjacent alignment portion to the front face of the ferrule body. As such, the opening of the lead-in portion through the front face of the ferrule body is larger in lateral cross-section than the opening of the lead-in portion into the adjacent alignment portion. The lead-in portion is therefore capable of guiding the respective alignment member into the adjacent alignment portion that, in turn, is sized to snugly receive the alignment member, thereby serving to properly align the ferrule with the alignment members.

In one advantageous embodiment, the ferrule body fully defines the elongate hole to form a guide pin hole adapted to receive a respective guide pin. As such, the multifiber ferrule of this embodiment may be an MT-type ferrule. Alternatively, the ferrule body may only partially define the hole to thereby form an elongate groove adapted to receive a respective alignment rib. As such, the multifiber ferrule of this embodiment can be an SC or DC-type ferrule having at least one and, more typically, a pair of elongate grooves extending along the opposed side surfaces thereof.

In order to guide the respective alignment member into the adjacent alignment portion, the lead-in portion preferably has a smooth wall that expands radially outward from the longitudinal axis in the direction extending from the adjacent alignment portion toward the front face of the ferrule body. In one embodiment, the lead-in portion linearly expands in a radially outward direction from the longitudinal axis. In another embodiment, the lead-in portion expands radially outward from the longitudinal axis in a nonlinear manner such that the smooth wall of the lead-in portion is curved.

In order to guide the respective alignment member into the elongate hole while at the same time snugly engaging the alignment member so as to provide sufficiently precise alignment, the lead-in portion is preferably shorter than the adjacent alignment portion, as measured along the longitudinal axis. In this regard, the ratio of the length of the alignment portion to the length of the lead-in portion is preferably at least 4:1 and, more preferably, at least 6:1. As such, once the alignment member has been inserted into the respective hole, such as a respective guide pin hole or an elongate groove, the alignment portion snugly engages the alignment member so as to align the multifiber ferrule with another multifiber ferrule.

While the length of the lead-in portion is generally much shorter than the length of the adjacent alignment portion, the lead-in portion is preferably sized such that the lead-in portion proximate the front face is at least 50% larger in lateral cross-section than the alignment portion. As such, the multifiber ferrule of the present invention significantly reduces pin stubbing since the lead-in portion of the hole defined by the ferrule body cooperates with the tapered leading end of a guide pin to significantly increase the size of the region in which a guide pin will be appropriately guided into the hole without pin stubbing. In addition, the enlarged lead-in portion reduces gouging and other damage to an alignment rib during the insertion of an SC or DC-type ferrule into a corresponding alignment sleeve. Finally, the enlarged lead-in portion serves as a receptacle for dirt or other particulates that are wiped from the alignment member as the alignment member is inserted into the hole. As such, the dirt or other particulates do not accumulate upon the front face of the ferrule body. The multifiber ferrule of the present invention can therefore make physical contact more reliably with other multifiber ferrules during the mating process.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
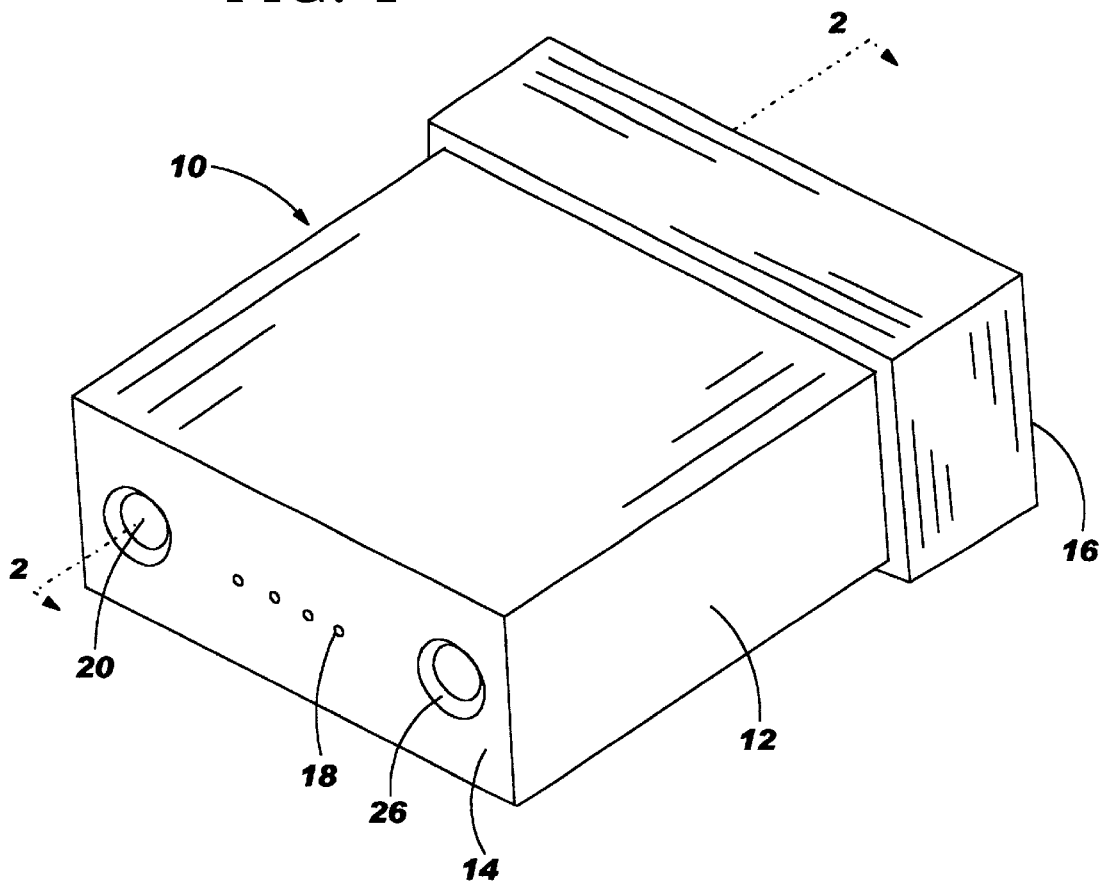
FIG. 1 is a perspective view of a multifiber ferrule according to one embodiment of the present invention.

Referring now to FIG. 1, a multifiber ferrule 10 according to one advantageous embodiment of the present invention is illustrated. The illustrated embodiment of the multifiber ferrule is an MT-type ferrule having a ferrule body 12 that is generally rectangular in lateral cross-section. As described below, however, the multifiber ferrule need not be an MT-type ferrule, but can be another type of ferrule, such as an SC-DC type of ferrule. Regardless of the type, the multifiber ferrule extends lengthwise between opposed front and rear faces 14,16. In addition, the ferrule body defines a plurality of bores 18 through which the end portions of respective optical fibers extend. Although the illustrated embodiment of the multifiber ferrule defines four bores such that the multifiber ferrule can be mounted upon the end portions of four optical fibers, the multifiber ferrule can define any number of bores, such as 2, 4, 8 or more.

Figure 5A:
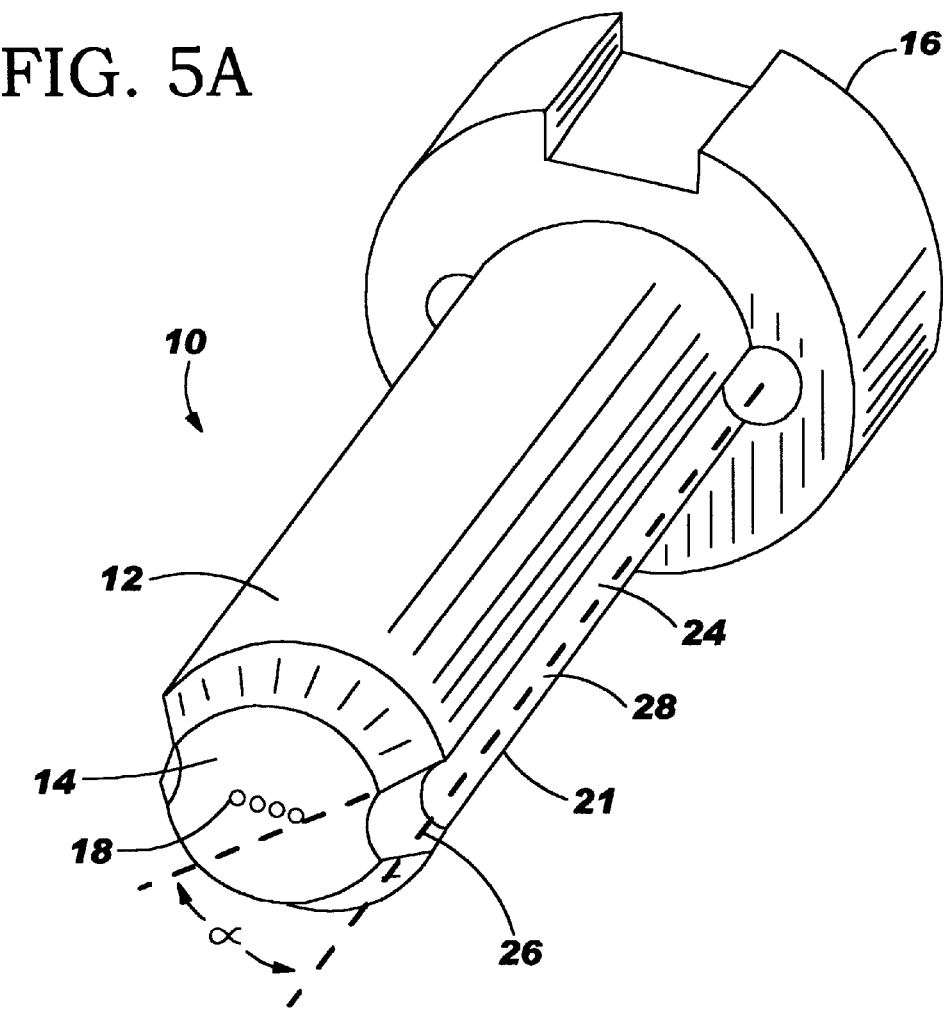
FIGS. 5A and 5B are a perspective and end views, respectively, of a multifiber ferrule according to another embodiment of the present invention that has a ferrule body that defines elongate grooves along opposed side surfaces thereof, each of which has an enlarged lead-in portion.
Figure 5B:
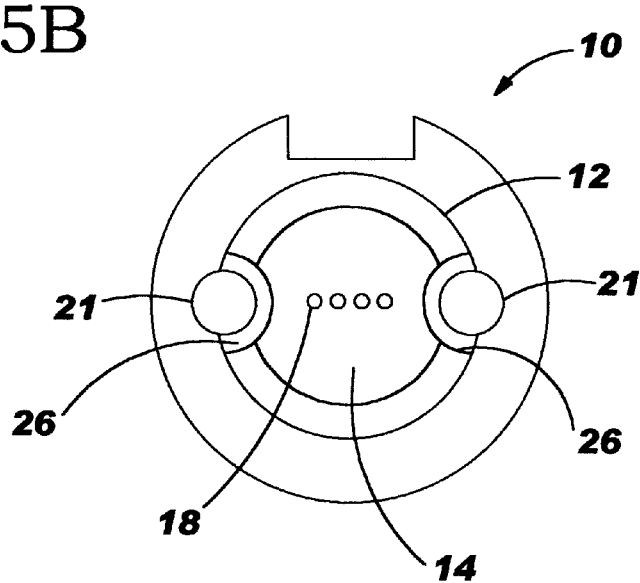

The ferrule body 12 also at least partially defines at least one elongate hole 20, i.e., an alignment hole, opening through the front face 14 and adapted to receive a respective alignment member 22 in order to align the multifiber ferrule 10. In instances in which the multifiber ferrule is an MT-type ferrule, the ferrule body preferably fully defines at least one and, more typically, a pair of guide pin holes for receiving respective guide pins. In embodiments in which the multifiber ferrule is an SC-DC ferrule, such as shown in FIGS. 5A and 5B, the ferrule body only partially defines at least one and, more typically, a pair of holes in the form of a pair of elongate grooves 21 extending lengthwise along opposed side surfaces of the ferrule body. Regardless of the type of ferrule, each elongate hole that is at least partially defined by the ferrule body, in turn, defines a longitudinal axis 24 extending therethrough.

In contrast to conventional guide pin holes and alignment grooves that have the same size and shape along their entire length, each elongate hole 20 defined by the ferrule body 12 of the present invention includes a lead-in portion 26 proximate the front face 14 and an adjacent alignment portion 28 that are sized and shaped differently, as described hereinbelow. In particular, the lead-in portion extends radially outward from the longitudinal axis 24 in a direction extending from the adjacent alignment portion toward the front face of the ferrule body. In other words, the lead-in portion adjacent the front face of the ferrule body is larger than the lead-in portion adjacent the alignment portion. As such, the lead-in portion is capable of guiding an alignment member into the adjacent alignment portion. The alignment portion is, in turn, sized to snugly receive the alignment member so as to provide the desired alignment of the multifiber ferrule 10 and, in turn, the optical fibers upon which the multifiber ferrule is mounted relative to the alignment member.

Figure 2:
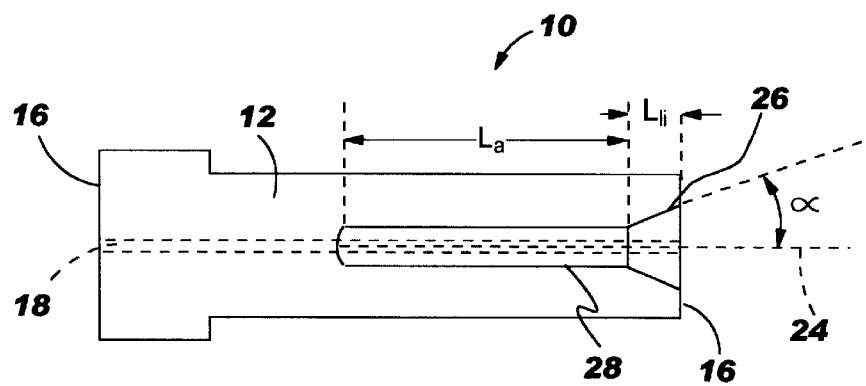
FIG. 2 is a cross-sectional view taken along line 2—2 of FIG. 1 that illustrates the relative size and shape of the lead-in portion and the adjacent alignment portion of the guide pin hole defined by the multifiber ferrule.
Figure 3:
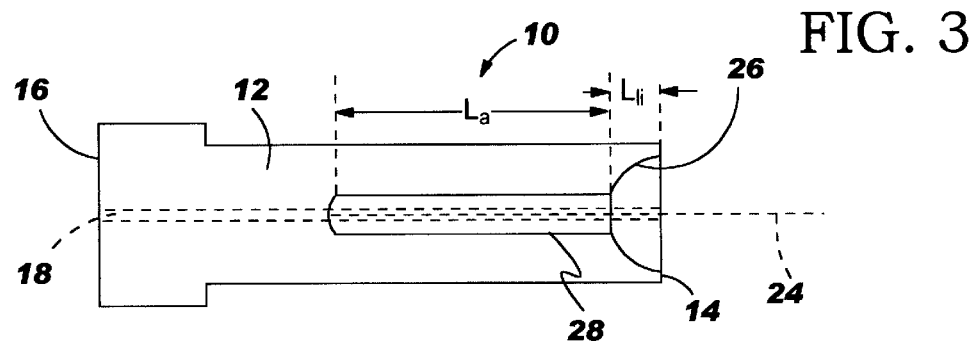
FIG. 3 is a cross-sectional view similar to FIG. 2 depicting a guide pin hole defined by the multifiber ferrule of another embodiment of the present invention that has a lead-in portion with curved walls.

The lead-in portion 26 can extend radially outward in a variety of manners without departing from the spirit and scope of the present invention. In preferred embodiments, however, the sidewall of the lead-in portion is preferably smooth to further facilitate insertion of the alignment member into the adjacent alignment portion 28. As shown in FIG. 2, the lead-in portion can linearly expand in a radially outward direction from the longitudinal axis 24. Although the lead-in portion can be designed to expand at a variety of angles ∀, the lead-in portion of one advantageous embodiment linearly expands so as to define an angle of 45° with respect to the longitudinal axis of the respective elongate hole 20. In this manner, the resulting lead-in portion has a generally frustoconical shape. Alternatively, the lead-in portion can expand radially outward from the longitudinal axis in a nonlinear manner such that the smooth wall of the lead-in portion is curved. As shown in FIG. 3, for example, the lead-in portion can be shaped such that the sidewall of the lead-in portion is concave. Although not illustrated, the lead-in portion can expand in other nonlinear manners to define other curved shapes, such as convex shapes without departing from the spirit and scope of the present invention.

Figure 4A:
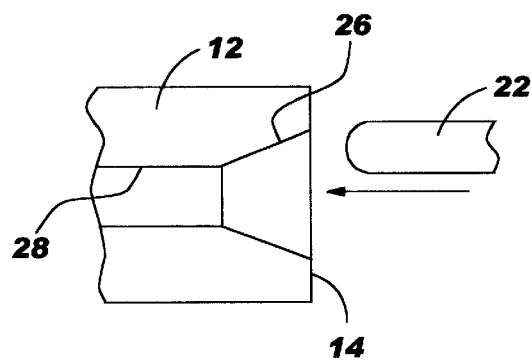
FIGS. 4A–4C are sequential schematic views illustrating the insertion of a guide pin into a guide pin hole defined by the ferrule body of a multifiber ferrule according to one advantageous embodiment of the present invention.

Regardless of the shape of the lead-in portion 26, the lead-in portion serves to guide the respective alignment member into the adjacent alignment portion 28. In embodiments in which the multifiber ferrule 10 is an MT-type ferrule defining a pair of guide pin holes 20, each guide pin hole has a respective lead-in portion that significantly reduces pin stubbing during mating of a pair of multifiber connectors 10, as described below. In this regard, since the lead-in portion is larger at the front face 14 of the ferrule body 12 than at the alignment portion, a technician can more easily insert the leading end of the guide pins 22 into the lead-in portion of the guide pin holes, as opposed to the smaller alignment portion that typically has the same size as the guide pin holes defined by conventional MT ferrules. In instances in which at least the leading end of the guide pin is tapered, the lead-in portion cooperates with the tapered leading end of the guide pin to further facilitate the insertion of the guide pins into the respective guide pin holes. As shown in FIG. 4A, which is greatly enlarged for purposes of illustration, the lead-in portion can capture the leading end of a guide pin even in instances in which the guide pin would otherwise have missed the guide pin holes and been stubbed against the front face of the ferrule body. After capturing the leading end of the guide pin, the lead-in portion funnels the leading end of the guide pin into the adjacent alignment portion as the guide pin is further inserted into the guide pin hole.

Figure 4B:
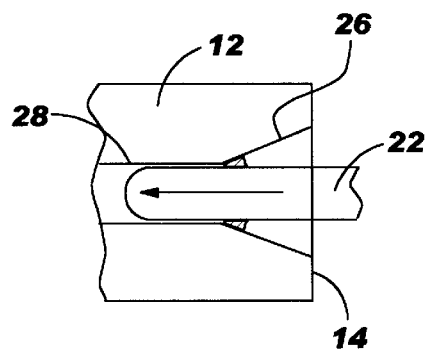
Figure 4C:
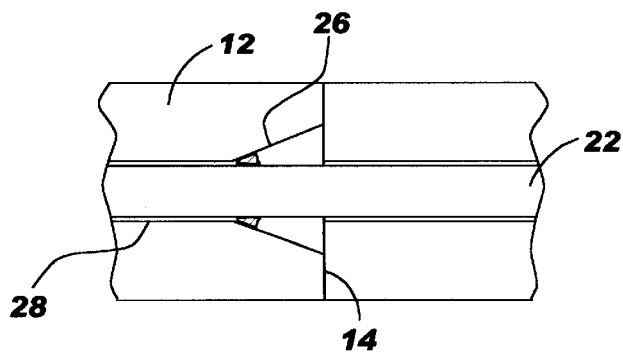

In addition to reducing instances of pin stubbing, the lead-in portion 26 defined by the multifiber ferrule 10 of the present invention serves as a repository or receptacle for dirt and other particulates that are carried by the alignment member 22, such as by a guide pin or alignment rib, and that may be wiped from the alignment member as the alignment member is inserted into the alignment hole 20. In addition, dirt or other particulates carried by an alignment member may be wiped from the alignment member as the alignment member is inserted into the respective alignment hole since the hole is sized to snugly receive the alignment member. For example, MT-type ferrules designed for multimode applications generally define the guide pin holes to be only 2 to 3 microns larger than the respective guide pins. In this regard, the tolerances are even further diminished in single mode applications in which MT-type ferrules only permit the guide pin holes to be about 1 micron larger than the respective guide pins. As a result of the extremely snug fit of the alignment members within the respective holes, the dirt and other particulates carried by the alignment members are wiped from the surface of the alignment member as the alignment member is inserted into a respective hole. As shown in FIG. 4B, for example, the dirt and other particulates are generally wiped from the alignment member as the alignment member is inserted into the portion of the alignment hole that is designed to snugly receive the alignment member, that is, as the guide pin is inserted into the alignment portion 28. As such, the dirt and other particulates collect within that portion of the lead-in portion proximate the alignment portion. By collecting the dirt and other particulates, the lead-in portion protects the front face 14 of the ferrule from having dirt and other particulates deposited thereon, as typically occurs with conventional multifiber ferrules. As shown in FIG. 4C, physical contact can therefore be established between a pair of multifiber ferrules even after a significant amount of dirt and other particulates have been wiped from the alignment members since the dirt and other particulates collect within the lead-in portion and do not obstruct the front face of the ferrules. By permitting physical contact between the front faces of the multifiber ferrules, the quality of the resulting optical connection is maintained at a high level.

The ferrule body 12 can define the lead-in portion 26 and the adjacent alignment portion 28 to have a variety of different lengths as measured along the longitudinal axis 24. During the design process, however, the alignment function provided by the snug fit of the alignment member 22 within the alignment portion must be balanced against the size and length of the lead-in portion. In this regard, as the lead-in portion becomes longer, the alignment portion becomes shorter and, as a result, the length of the alignment hole that will snugly engage the alignment member is likewise shortened. In one advantageous embodiment, the length of the alignment portion $L_a$ and the length of the lead-in portion $L_{li}$, as measured along the longitudinal axis, define the ratio of at least 4:1, such as 5:1 and, more preferably, 6:1. In this regard, the length of the alignment portion $L_a$ refers to the length of the alignment portion that will engage the alignment member, i.e., the effective length, and not other portions of the alignment hole that are spaced from the front face 14 by a distance greater than the depth to which the alignment member will be inserted into the alignment hole. With respect to an MT-type ferrule, for example, the guide pin is generally inserted about 1.75 millimeters into the respective guide pin hole. As such, it has been determined that sufficient alignment precision can be maintained by defining the lead-in portion to have a length $L_{li}$ of about 0.25 millimeters such that the alignment portion will have an effective length $L_a$ of about 1.50 millimeters. However, the lead-in portion can be shorter or longer and the alignment portion can be correspondingly longer or shorter without departing from the spirit and scope of the present invention.

The lead-in portion 26 can be designed such that the relationship of the size of the lead-in portion adjacent the front face 14 of the ferrule body 12 and the size of the lead-in portion proximate the alignment portion 28 is tailored as desired for the particular application. In one advantageous embodiment, for example, the lead-in portion adjacent the front face is at least 50% larger than the alignment portion, thereby serving to guide guide pins that are in the vicinity of the hole into the respective alignment portion.

Figure 6:
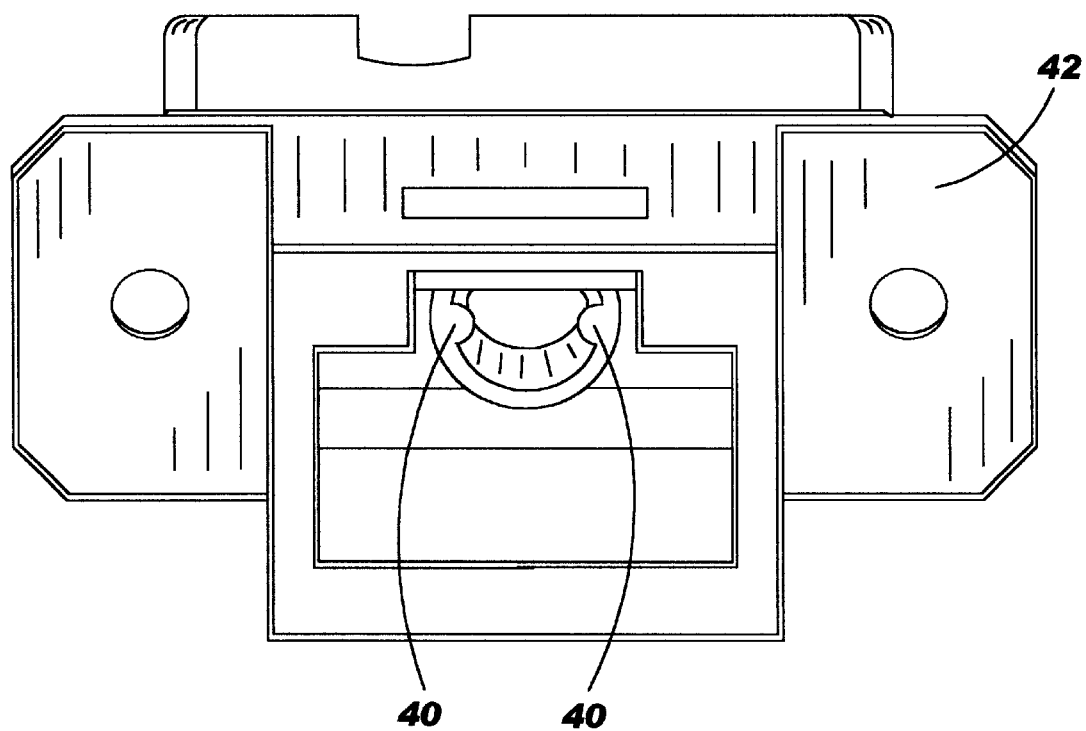
FIG. 6 is a perspective view of an alignment sleeve for receiving the multifiber ferrule of FIGS. 5A and 5B.

While the multifiber ferrule 10 of one advantageous embodiment that is in the form of an MT-type ferrule has been illustrated and described, the multifiber ferrule of the present invention can be of other types and can have other shapes and sizes without departing from the spirit and scope of the present invention. In this regard, the multifiber ferrule can be an SC or DC-type ferrule having a generally circular shape in lateral cross section as shown in FIGS. 5A and 5B. As depicted, the alignment holes that are partially defined by the ferrule body 12 of this embodiment are in the form of at least one and, more typically, a pair of elongate grooves 20 that extend lengthwise along opposed side surfaces of the ferrule body. These grooves are designed to slidably receive an alignment rib 42 as the multifiber ferrule is inserted into one end of an alignment sleeve 40. See, for example, FIG. 6 in which an alignment sleeve for receiving a multifiber ferrule as shown in FIGS. 5A and 5B is depicted. As known to those skilled in the art, the alignment ribs or pins of an alignment sleeve typically serve to align a pair of multifiber ferrules and, in turn, the optical fibers upon which the multifiber ferrules are mounted.

According to the present embodiment, each groove 20 includes a lead-in portion 26 proximate the front face 14 and an adjacent alignment portion 28. The alignment portion has a generally semi-circular shape and is sized to snugly receive a respective alignment rib. As described above in conjunction with other embodiments with the multifiber ferrule 10, however, the lead-in portion expands radially outward from the longitudinal axis 24 in a direction extending from the adjacent alignment portion to the front face of the ferrule body 12. As such, the lead-in portion is capable of guiding the respective alignment rib into the adjacent alignment portion. As described above, the lead-in portion reduces the stubbing of the alignment rib 40 into the front face of the ferrule body as the alignment rib is inserted into the respective groove. Since the multifiber ferrule of this embodiment of the present invention no longer includes the sharp 90° edge proximate the front face of the ferrule, the lead-in portion also serves to guide the alignment rib into the alignment portion of the groove without gouging or otherwise damaging the alignment rib. As such, the alignment sleeve, including the alignment ribs or pins, can continue to reliably and precisely align multifiber ferrules as described above.

The lead-in portion 26 of the elongate grooves 20 defined by an SC or DC-type ferrule 16 also preferably has a smooth wall that expands radially outward from the longitudinal axis 24 in the direction extending from the adjacent alignment portion 28 to the front face 14 of the ferrule body 12. In one embodiment, the lead-in portion linearly expands in a radially outward direction from the longitudinal axis so as to define an angle α with respect to the longitudinal axis, such as between about 20° and 45° in one advantageous embodiment. See FIG. 5A. In another embodiment, however, the lead-in portion expands radially outward from the longitudinal axis in a nonlinear manner such that the smooth wall of the lead-in portion is curved. As explained above, in conjunction with other embodiments of the multifiber ferrule, the smooth wall of the lead-in portion can be curved in either a concave or convex manner.

As described above in conjunction with other embodiments of the multifiber ferrule 10, the lead-in portion 26 can be sized in a variety of manners without departing from the spirit and scope of the present invention. In one advantageous embodiment, for example, the lead-in portion expands in a radially outward direction such that the size of the elongate groove 20 adjacent the front face 14 is at least 50% larger than the alignment portion 28 of the elongate groove. As also described above, the alignment portion of the elongate groove is preferably sized to snugly receive the alignment rib 40 such that dirt and other particulates carried by the alignment rib are wiped from the alignment rib and collected within the lead-in portion of the groove. As such, the dirt and other particulates do not accumulate on the front face of the ferrule, thereby permitting the front face of the ferrule to physically contact the front face of another ferrule inserted into the opposed end of the alignment sleeve.

In addition, the respective lengths of the lead-in portion 26 and the alignment portion 28 can be selected as desired for a particular application. As explained above, the respective lengths of the lead-in portion and the alignment portion are preferably selected such that the lead-in portion is sufficiently large to guide the alignment rib 40 into the elongate groove 20 while insuring that a sufficient length of the alignment rib is snugly received within the alignment portion of the elongate groove in order to properly align the ferrule 10. As described above, the multifiber ferrule typically defines the elongate grooves such that the length of the alignment portion $L_a$ to the length of the lead-in portion $L_{li}$ has a ratio of about 4:1, such as 5:1 and, more typically, about 6:1. For example, the lead-in portion of one embodiment has a length $L_{li}$, as measured along the longitudinal axis 24, of about 0.25 millimeters. As such, an alignment rib that is about 1.75 millimeters in length will engage an alignment portion that is about 1.50 millimeters in length, thereby providing suitable alignment precision for most applications.

As exemplified by the foregoing description, the multifiber ferrule 10 of the present invention can have a number of different embodiments. However, the multifiber ferrule of each of these embodiments at least partially defines at least one elongate hole 20 having a lead-in portion 26 that guides the respective alignment member 22, 40 into an adjacent alignment portion 28, thereby reducing instances of pin stubbing for MT-type ferrules and significantly reducing gouging or other damage to the alignment ribs or pins by SC-DC type ferrules. In addition, the lead-in portion serves as a repository or receptacle for dirt and other particulates that are wiped from the alignment member upon its insertion into the snug fitting alignment portion. As such, the dirt and other particulates do not accumulate upon the front face 14 of the ferrule such that the multifiber ferrule of the present invention can continue to physically contact other ferrules during the alignment and interconnection process, thereby maintaining the quality of the optical interconnection of the respective optical fibers upon which the multifiber ferrules are mated.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multifiber ferrule comprising:

a ferrule body having a front face and an opposed rear face and defining a plurality of bores extending therebetween for receiving end portions of respective optical fibers, said ferrule body also at least partially defining at least one elongate hole opening through the front face and adapted to receive a respective alignment member in order to align the multifiber ferrule, wherein the elongate hole that is at least partially defined by said ferrule body defines a longitudinal axis extending therethrough, and wherein the elongate hole includes a lead-in portion proximate the front face and an adjacent alignment portion, the lead-in portion expanding radially outward from the longitudinal axis in a direction extending from the adjacent alignment portion to the front face of said ferrule body such that the lead-in portion is capable of guiding the respective alignment member into the adjacent alignment portion.

2. The multifiber ferrule according to claim 1 wherein said ferrule body fully defines the hole such that the resulting guide pin hole is adapted to receive a respective guide pin.

3. The multifiber ferrule according to claim 1 wherein said ferrule body only partially defines the hole such that the resulting groove is adapted to receive a respective alignment rib.

4. The multifiber ferrule according to claim 1 wherein the lead-in portion linearly expands in a radially outward direction from the longitudinal axis.

5. The multifiber ferrule according to claim 1 wherein the lead-in portion expands radially outward from the longitudinal axis in a nonlinear manner such that the smooth wall of the lead-in portion is curved.

6. The multifiber ferrule according to claim 1 wherein a ratio of the length of the alignment portion to the length of the lead-in portion is at least 4:1.

7. A multifiber ferrule comprising:

a ferrule body having a front face and an opposed rear face and defining a plurality of bores extending therebetween for receiving end portions of respective optical fibers, said ferrule body also defining at least one guide pin hole opening through the front face and adapted to receive a respective guide pin in order to align the multifiber ferrule, wherein the guide pin hole defines a longitudinal axis extending therethrough and includes a lead-in portion proximate the front face and an adjacent alignment portion, the lead-in portion expanding radially outward from the longitudinal axis in a direction extending from the adjacent alignment portion to the front face of said ferrule body such that the lead-in portion is capable of guiding the respective guide pin into the adjacent alignment portion.

8. The multifiber ferrule according to claim 7 wherein the lead-in portion linearly expands in a radially outward direction from the longitudinal axis such that the lead-in portion has a frustoconical shape.

9. The multifiber ferrule according to claim 7 wherein the lead-in portion expands radially outward from the longitudinal axis in a nonlinear manner such that the wall of the lead-in portion is curved.

10. The multifiber ferrule according to claim 7 wherein the lead-in portion is shorter than the adjacent alignment portion as measured along the longitudinal axis.

11. The multifiber ferrule according to claim 10 wherein a ratio of the length of the alignment portion to the length of the lead-in portion is at least 4:1.

12. The multifiber ferrule according to claim 7 wherein the lead-in portion is sized such that the lead-in portion proximate the front face is at least 50% larger in lateral cross-section than the alignment portion.

13. A multifiber ferrule comprising:

a ferrule body having a front face and an opposed rear face and defining a plurality of bores extending therebetween for receiving end portions of respective optical fibers, said ferrule body also defining at least one groove extending along a side surface of said ferrule body and adapted to receive a respective alignment rib in order to align the multifiber ferrule, wherein the groove defines a longitudinal axis extending therethrough and includes a lead-in portion proximate the front face and an adjacent alignment portion, the lead-in portion expanding radially outward from the longitudinal axis in a direction extending from the adjacent alignment portion to the front face of said ferrule body such that the lead-in portion is capable of guiding the respective alignment rib into the adjacent alignment portion.

14. The multifiber ferrule according to claim 13 wherein the lead-in portion linearly expands in a radially outward direction from the longitudinal axis.

15. The multifiber ferrule according to claim 13 wherein the lead-in portion expands radially outward from the longitudinal axis in a nonlinear manner such that the wall of the lead-in portion is curved.

16. The multifiber ferrule according to claim 13 wherein the lead-in portion is shorter than the adjacent alignment portion as measured along the longitudinal axis.

17. The multifiber ferrule according to claim 16 wherein a ratio of the length of the alignment portion to the length of the lead-in portion is at least 4:1.

18. The multifiber ferrule according to claim 17 wherein a ratio of the length of the alignment portion to the length of the lead-in portion is at least 5:1.

19. The multifiber ferrule according to claim 18 wherein a ratio of the length of the alignment portion to the length of the lead-in portion is at least 6:1.

20. The multifiber ferrule according to claim 13 wherein the lead-in portion is sized such that the lead-in portion proximate the front face is at least 50% larger in lateral cross-section than the alignment portion.

* * * * *